(12) United States Patent
Fyke et al.

(10) Patent No.: US 8,836,472 B2
(45) Date of Patent: Sep. 16, 2014

(54) COMBINING NAVIGATION AND FINGERPRINT SENSING

(75) Inventors: Steven Henry Fyke, Waterloo (CA); Jason Tyler Griffin, Kitchener (CA)

(73) Assignee: BlackBerry Limited, Waterloo (CA)

(*) Notice: Subject to any disclaimer, the term of this patent is extended or adjusted under 35 U.S.C. 154(b) by 228 days.

(21) Appl. No.: 13/303,344

(22) Filed: Nov. 23, 2011

(65) Prior Publication Data
US 2013/0127592 A1    May 23, 2013

(51) Int. Cl.
*G05B 23/00* (2006.01)
*G07C 9/00* (2006.01)
*G06F 21/32* (2013.01)

(52) U.S. Cl.
CPC ............ *G06F 21/32* (2013.01); *G07C 9/00158* (2013.01); *G07C 2209/08* (2013.01)
USPC ........ 340/5.52; 340/5.53; 340/5.83; 382/124; 382/126

(58) Field of Classification Search
CPC ...................................................... G06F 21/32
USPC ................ 340/5.52, 5.53, 5.83; 382/124, 126
See application file for complete search history.

(56) References Cited

U.S. PATENT DOCUMENTS

| | | | |
|---|---|---|---|
| 5,229,764 A | 7/1993 | Matchett et al. | |
| 2002/0150282 A1 | 10/2002 | Kinsellla | |
| 2007/0192591 A1 | 8/2007 | Yumoto et al. | |
| 2009/0224874 A1* | 9/2009 | Dewar et al. | 340/5.53 |
| 2010/0216429 A1 | 8/2010 | Mahajan | |
| 2011/0035338 A1* | 2/2011 | Kagan et al. | 705/412 |
| 2013/0076485 A1* | 3/2013 | Mullins | 340/5.83 |

FOREIGN PATENT DOCUMENTS

| | | |
|---|---|---|
| EP | 0 969 644 A1 | 1/2000 |
| EP | 1 521 161 A2 | 4/2005 |
| EP | 1 857 954 A1 | 11/2007 |
| EP | 1 873 999 A1 | 1/2008 |

OTHER PUBLICATIONS

Extended European Search Report from corresponding European Patent Application No. 111902540; dated Feb. 17, 2012; 8 pages.
Office Action for Canadian Patent Application No. 2,793,445 dated Apr. 28, 2014, (4 pages).

\* cited by examiner

*Primary Examiner* — Tai T Nguyen
(74) *Attorney, Agent, or Firm* — Ridout & Maybee LLP

(57) ABSTRACT

A method and system are disclosed whereby fingerprint data is attempted to be captured from a touch sensitive input device during normal operation of an electronic device. If fingerprint data matching a stored fingerprint data is not captured within a threshold time period, security action is taken.

22 Claims, 7 Drawing Sheets

COMBINING NAVIGATION AND FINGERPRINT SENSING

TECHNICAL FIELD

The present disclosure relates generally to finger print sensing.

BACKGROUND

Touch sensitive input devices are becoming common for navigating with applications on electronic devices.

Passwords may be used in many situations where a user needs to be authenticated before using a portion of an electronic device. Situations requiring authentication may include the ability to access or use a computer, mobile phone, PDA, or any other device; they may also enable access to a physical location, or allow use of a credit/debit card or similar instrument. Passwords are typically alphanumeric strings or sequences entered on a keyboard. However, with the advent of touch sensitive input devices, graphical authentication systems are also available. For example, a user may have align icons on a display or touch certain images in a particular order in order to authenticate.

Some systems capture fingerprint data from a user in order to authenticate. Fingerprint sensors may be combined with touch sensitive input devices.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
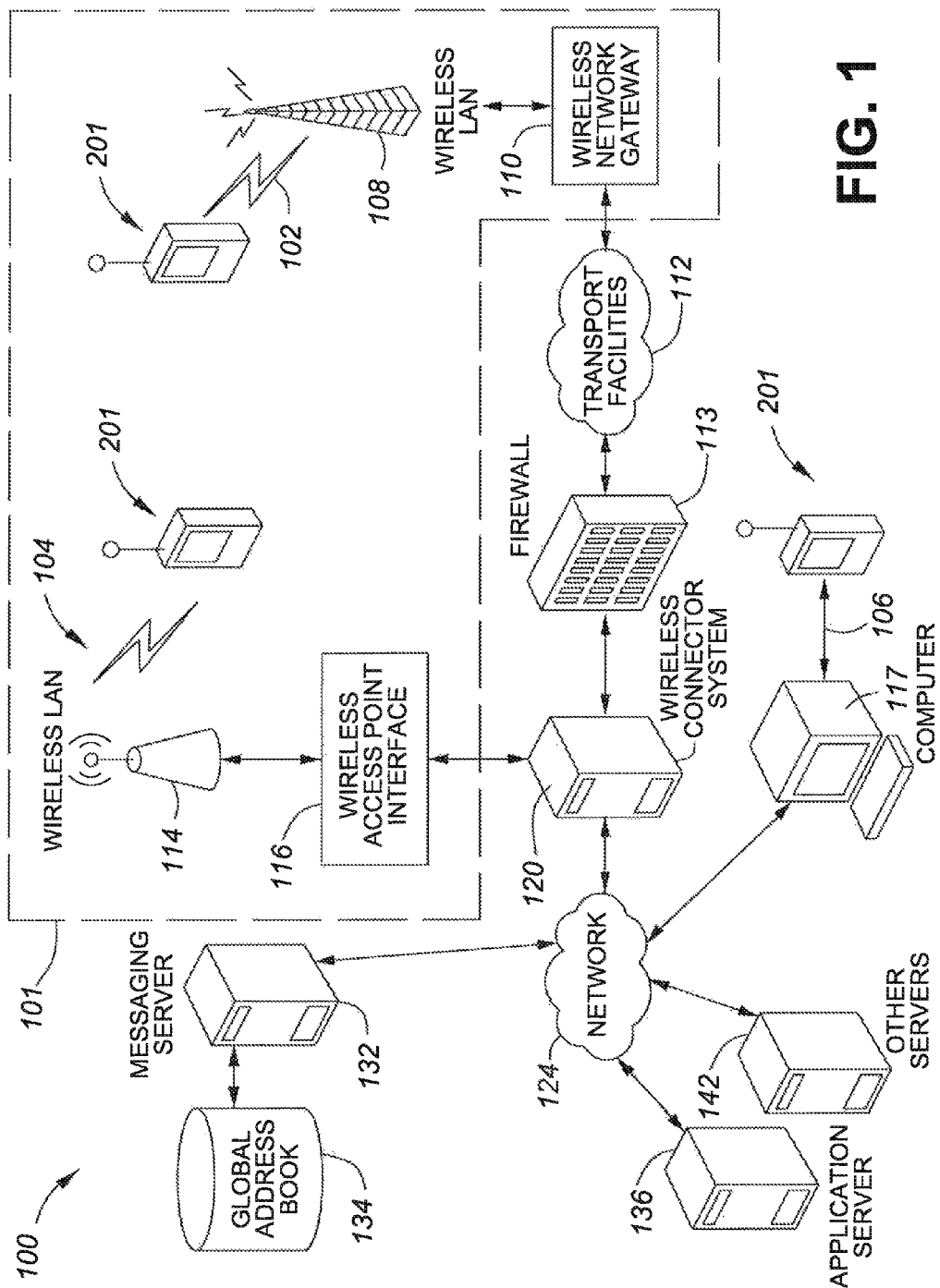
FIG. 1 is a block diagram illustrating a communication system including a mobile communication device in which example embodiments of the present disclosure can be applied.

Typically, authentication systems restrict access by requiring a user to authenticate before permitting access to a system or application. Some systems may require a user to re-authenticate after a period of time. The present application discloses a method and system for determining if an application, device or system or portions thereof continues to be used by an authorized user by capturing fingerprint data during normal operation and comparing that data with a stored fingerprint data for an authorized user. The normal operation in some embodiments includes navigating using a touch sensitive input device such as a touch pad or a touch screen. Capturing fingerprint data and checking the captured data against stored data for authorized user can prevent a third party from accessing the application, device or system after an authorized user has authenticated in a manner that does not inhibit regular use. Additionally, the third party is not alerted to the fact that his or her authorization to use the application, device or system is being verified.

If valid fingerprint information can not be captured within a certain time period, a security action can be taken. A number of reasons for not capturing valid fingerprint data can exist and the security action taken can be customized according to the reason or according to the level of security required. For example, it is possible that the enough fingerprint data to compare with the stored fingerprint is not captured for technical reasons. For example, a clear image of the fingerprint could not be recreated because of dirt on the input device. Therefore, in some embodiments, the security actions may be to request that the user input fingerprint data by for example, holding a finger on a fingerprint sensor. It is also possible, that enough data is captured to make the comparison and that the fingerprint data captured does not match stored fingerprint data. When enough data is captured but there is no match, the present user is likely not the authorized user. Thus, possible security actions can include locking the device, requiring some other form of authentication and turning off the device. In some cases, portions or all of the memory of the device may be erased immediately after the time period expires and fingerprint data matching the stored fingerprint data has not been captured or after subsequent authentication fails.

As mentioned, varying levels of security can be accommodated. For example, some implementations may require that the captured fingerprint data match fingerprint data for the user who logged into the current session. In other implementations, the fingerprint data may only need to match any authorized user. In some systems, the fingerprint data may be captured for some applications and not others.

Thus, in one aspect, there is provided a method comprising: during operation of a touch sensitive input device to perform a function other than authentication on an electronic device, attempting to capture fingerprint data; and if, after a threshold time period, fingerprint data matching a stored fingerprint data is not captured, taking a security action related to access to at least a portion of the electronic device.

In another aspect, there is provided a computer-readable medium having computer-executable instructions stored thereon that when executed implement a method, the method comprising: during operation of a touch sensitive input device to perform a function other than authentication on an electronic device, attempting to capture fingerprint data; and if, after a threshold time period, fingerprint data matching a stored fingerprint data is not captured, taking a security action related to access to at least a portion of the electronic device.

In another aspect, there is provided An electronic system comprising: an electronic device; a touch sensitive input device comprising a touch input sensor and a fingerprint sensor; and a processor configured to, during operation of the touch sensitive input device to perform a function other than authentication on an electronic device, attempt to capture fingerprint data from the fingerprint sensor and if, after a threshold time period, fingerprint data matching a stored fingerprint data is not captured, take a security action related to access to at least a portion of the electronic device.

Reference is first made to FIG. 1 which shows in block diagram of a communication system 100 in which example embodiments of the present disclosure can be applied. The communication system 100 comprises a number of mobile electronic devices 201 which may be connected to the remainder of system 100 in any of several different ways. Accordingly, several instances of mobile electronic devices 201 are depicted in FIG. 1 employing different example ways of connecting to system 100. Mobile electronic devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile electronic devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile electronic devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile electronic devices 201 to transport facilities 112, and through the transport facilities 112 to a wireless connector system 120. Transport facilities may include one or more private networks or lines, the public Internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile electronic devices 201 and other devices (not shown) connected, directly or indirectly, to the WWAN 102. Accordingly, communications sent via the mobile electronic devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile electronic devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile electronic devices 201. The wireless connector system 120 also provides administrative control and management capabilities over users and mobile electronic devices 201 which may connect to the wireless connector system 120.

The wireless connector system 120 allows the mobile electronic devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile electronic devices 201 in the wireless network 101, an authentication server and an application server for implementing server-based applications.

The global address book 134 comprises electronic contact records generated and maintained by an IT (information technology) administrator of the network 124. Typically, the global address book is maintained exclusively by the messaging server 132 and there is no local copy on the mobile electronic device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile electronic devices 201. In some embodiments, communications between the wireless connector system 120 and the mobile electronic devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile electronic device 201 over the WWAN 102 to the wireless connector system 120. The wireless connector system 120 then sends the data packets to the appropriate connection point such as the messaging server 132, other servers 142 or application servers 136. Conversely, the wireless connector system 120 sends data packets received, for example, from the messaging server 132 or other servers 142 to the wireless network gateway 110 which then transmit the data packets to the destination mobile electronic device 201. The AP interfaces 116 of the WLAN 104 provide similar sending functions between the mobile electronic device 201, the wireless connector system 120 and network connection point such as the messaging server 132, other servers 142 and application server 136.

The network 124 may comprise a private local area network, metropolitan area network, wide area network, the public Internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile electronic device 201 may alternatively connect to the wireless connector system 120 using a computer 117 via the network 124. In at least some embodiments, for security purposes the computers 117 with which the mobile electronic devices 201 can connect to the wireless connector system 120 are limited to computers 117 which are directly connected to the network 124. A link 106 may be provided for exchanging information between the mobile electronic device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile electronic device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile electronic devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
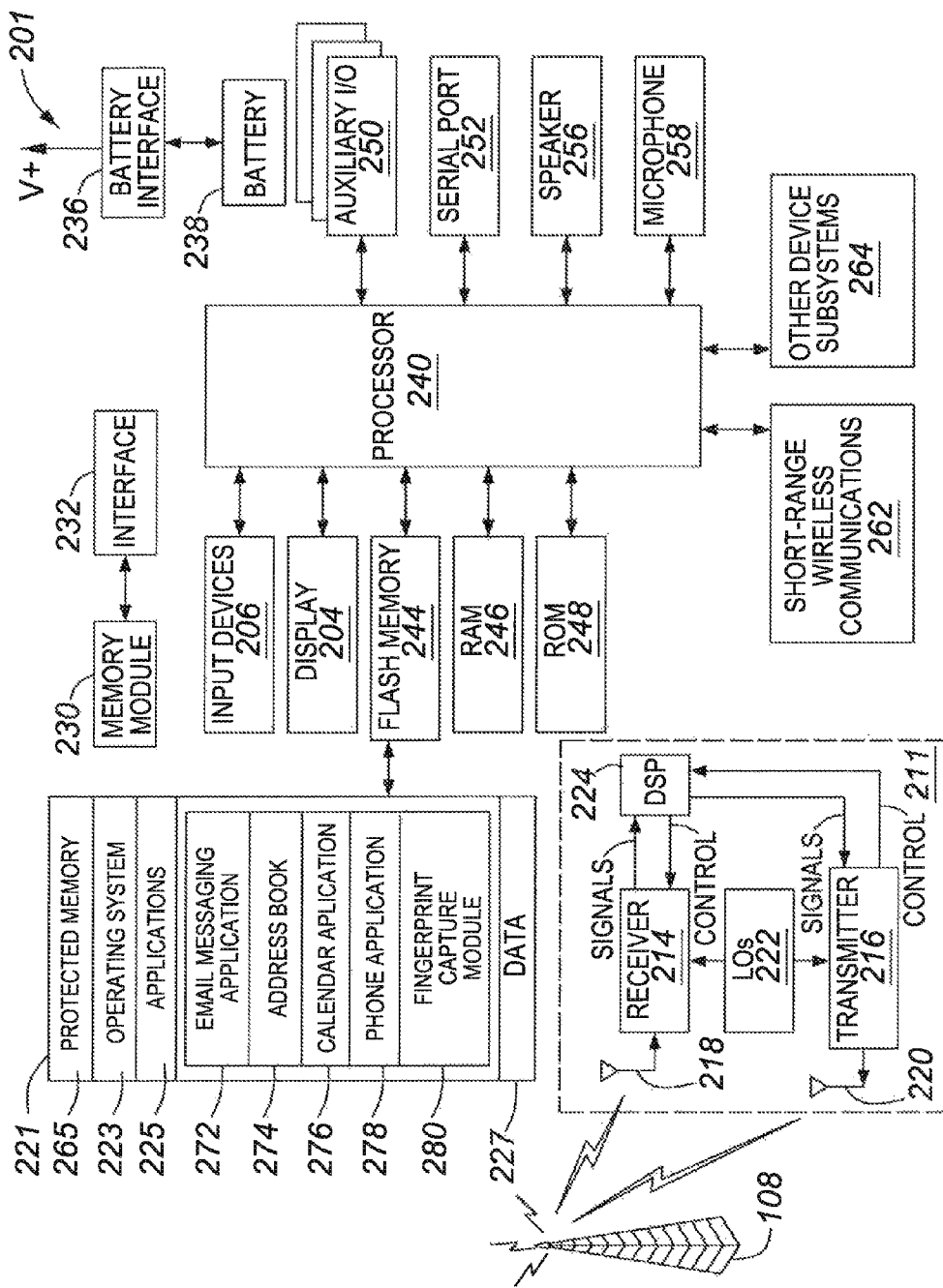
FIG. 2 is a block diagram illustrating a mobile communication device in accordance with one example embodiment of the present disclosure.

Reference is now made to FIG. 2 which illustrates an exemplary embodiment of the mobile electronic device 201 in which example embodiments described in the present disclosure can be applied. The mobile electronic device 201 is a two-way communication device having data and voice communication capabilities, and the capability to communicate with other computer systems, for example, via the Internet. Depending on the functionality provided by the mobile electronic device 201, in various embodiments the mobile electronic device 201 may be a multiple-mode communication device configured for both data and voice communication, a smartphone, a mobile telephone or a PDA (personal digital assistant) enabled for wireless communication, a tablet device or a computer system with a wireless modem.

The mobile electronic device 201 includes a rigid case (not shown) housing the components of the mobile electronic device 201. The internal components of the mobile electronic device 201 are constructed on a printed circuit board (PCB). The mobile electronic device 201 includes a controller comprising at least one processor 240 (such as a microprocessor) which controls the overall operation of the mobile electronic device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen and a touchscreen, input devices 206 such as a keyboard, a touchpad, a fingerprint sensor and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The mobile electronic device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations 108 of the wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and fingerprint capture module 280. The fingerprint capture module 280 includes instructions for implementing any of the methods described herein. It is recognized that the fingerprint capture module 280 and its various components as described herein can form a discrete module running on the mobile electronic device 201, or the functions of the fingerprint capture module 280 can be distributed on the mobile electronic device 201 as separate modules or integrated within other existing modules as desired. Such discrete or distributed implementations all fall within the embodiments of the fingerprint capture module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the mobile electronic device 201 such as receipt of an electronic message or incoming phone call, or for other purposes such as haptic feedback (touch feedback).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the mobile electronic device 201, while continuing to fall within the term phone application 278.

Figure 3:
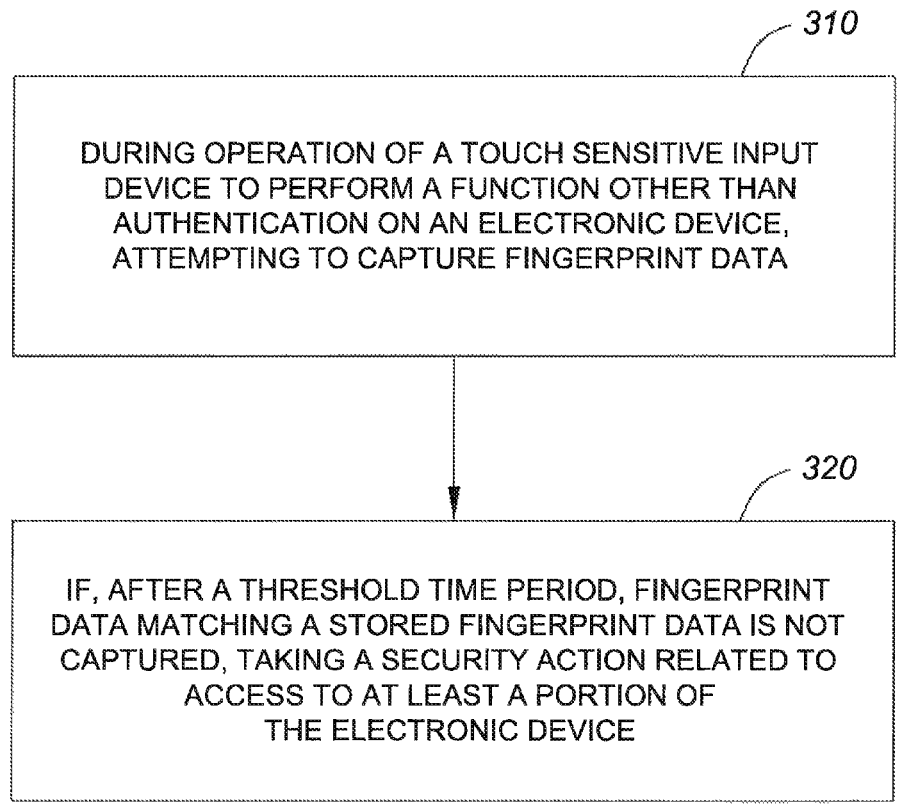
FIG. 3 is a flowchart of a method in accordance with one example embodiment of the present disclosure.

Referring now to FIG. 3, a method will be described. At action 310 the method starts with attempting to capture fingerprint data during operation of a touch sensitive input device to perform a function other than authentication on an electronic device. In some embodiments, the operation comprises navigating within an application.

In some embodiments, the fingerprint data is captured from an input device that combines a touch sensitive input sensor with a fingerprint sensor. Non-limiting examples of such a device include those made by Authentec and IDEX. For example, the SmartFinger® made by IDEX can be use in some embodiments. The fingerprint sensor in some embodiments is a capacitance sensor. In a capacitance sensor, pixel of a sensor array each acts as one plate of an effective parallel-plate capacitor. The dermal layer of the person's finger acts as the other plate and the epidermal layer acts as a dielectric. Capacitance sensors can be passive or active. Passive sensors use measured capacitance to distinguish between ridges and valleys on the finger. Active sensors apply a voltage to the skin of the finger before taking the measurements, which charges the effective capacitor, creating an electric field that follows the pattern of ridges on the skin. The voltage across the dermal layer and the sensor array on the discharge cycle is compared to a reference voltage to calculate capacitance and thus distinguish between ridges and valleys. In other embodiments the fingerprint sensor is an RF-based sensor. In other embodiments, the fingerprint sensor is an optical sensor. Optical sensors capture a digital image of the finger that is touching the sensor. In still other embodiments, the fingerprint sensor is an ultrasonic sensor, which uses measurements from reflected high frequency sound waves to form an image of the fingerprint.

At action 320, the method continues with taking a security action related to access to at least a portion of the electronic device if, after a threshold time period, fingerprint data matching a stored fingerprint data is not captured.

In some embodiments, taking the security action comprises denying access to the portion of the electronic device. In some embodiments, taking the security action comprises initiating an authentication process. For example, a login interface may be displayed and successful authentication may be required to continue to use the portion of the device. In some embodiments, taking the security action comprises locking the electronic device. In some embodiments, taking the security action comprises turning off the electronic device. Of course other security action and combinations of security actions are possible. As mentioned, the method is customizable.

In some embodiments, attempting to capture the finger print data takes place after a successful authentication. Thus the capturing of the fingerprint data can add an extra layer of security to another authentication process, which may or may not include fingerprint authentication.

In some embodiments, the stored fingerprint data is fingerprint data for a person authorized to access the portion of the electronic device. The person authorized to access the portion of the electronic device may or may not have already completed a successful authentication process. In some cases, multiple persons may be authorized to use the portion of the device without each logging in separately. By capturing the fingerprint data, this method can ensure that the portion of the device is being used by an authorized person even if the user changes after an initial authentication process. In some embodiments, the stored fingerprint data is fingerprint data for a person presently logged into the portion of the electronic device. In this manner, use of the portion of the electronic device can be restricted to the person presently logged in.

In some embodiments, the attempting to capture the fingerprint data is performed on a periodic basis. The periodic basis can be customized taking into consideration factors such as the level of security desired and the need to conserve battery power by not operating the fingerprint sensor at all times. Various factors can be balances in determining the threshold time period as well.

Fingerprint data for authorized user(s) can be stored locally on the electronic device or remotely, for example on an authentication server. Thus, in some embodiments, the method further comprises transmitting the captured fingerprint data to an authentication server to determine if the captured fingerprint data matches the stored fingerprint data.

There is also provided a computer-readable medium having computer-executable instructions stored thereon that when executed implement any of the methods described herein. In some embodiments, the computer-executable instructions are executed by a processor on the electronic device. In other embodiments, the computer-executable instructions are implemented by a remote processor, for example on a server. In some embodiments, the computer-readable instructions are implemented by more than one processor. In some embodiments, the computer-readable medium is the fingerprint capture module 280 referred to with reference to FIG. 2.

Figure 4:
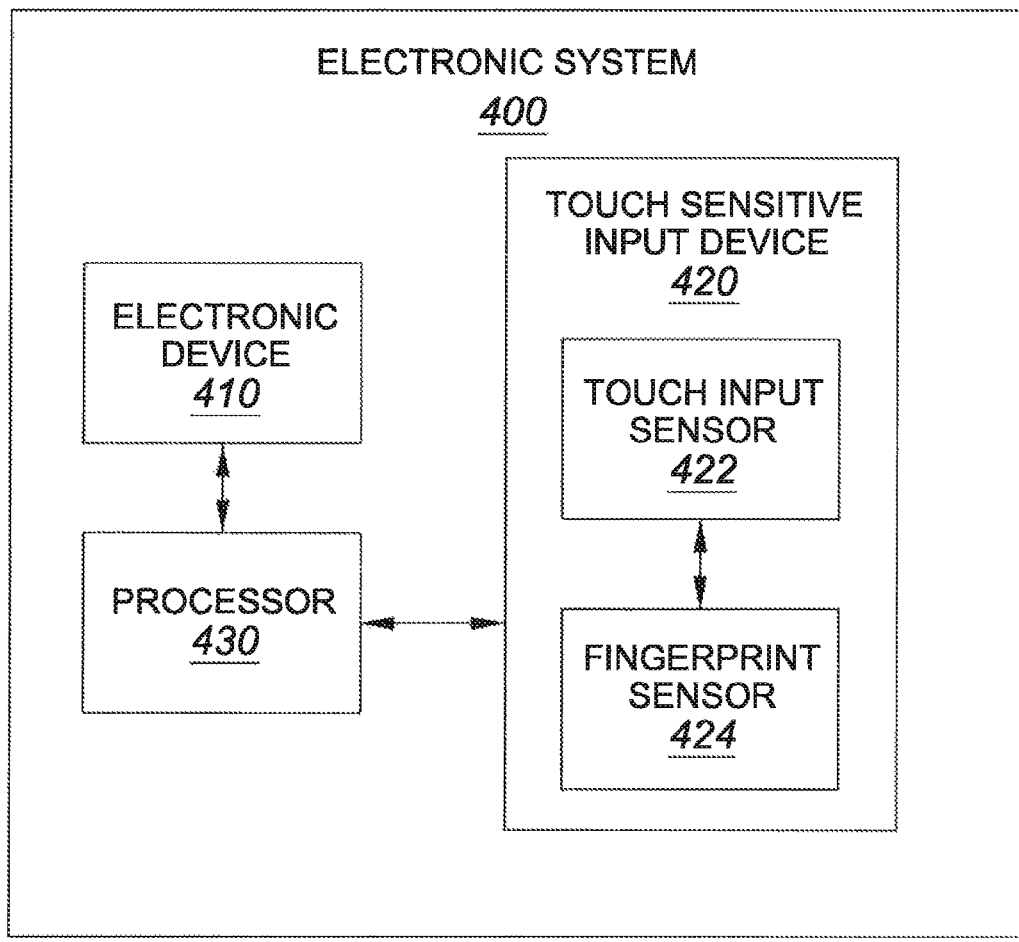
FIG. 4 is a block diagram of a system in accordance with one example embodiment of the present disclosure.

Referring now to FIG. 4, an electronic system 400 will be described. The electronic system 400 comprises an electronic device 410, a touch sensitive input device 420 and a processor 430. The touch sensitive input device 420 comprises a touch input module 422 and a fingerprint sensor 424. The processor 430 is configured to, during operation of the touch sensitive input device 420 to perform a function other than authentication on the electronic device, attempt to capture fingerprint data from the fingerprint sensor 424 and if, after a threshold time period, fingerprint data matching a stored fingerprint data is not captured, take a security action related to access to at least a portion of the electronic device 410.

The touch sensitive input device 420 may be located on the electronic device 410 in some embodiments and in other embodiments is a peripheral device. Examples of the touch sensitive input device include but are not limited to a touch screen display, a touch pad, and a touch sensitive navigation tool.

Examples of the electronic device include but are not limited to the mobile electronic device 201 described above, a mobile phone, a smart phone, a bank machine, a tablet device, a desktop computer, a laptop computer, a server, a personal digital assistant, and a multi-media device.

Figure 5:
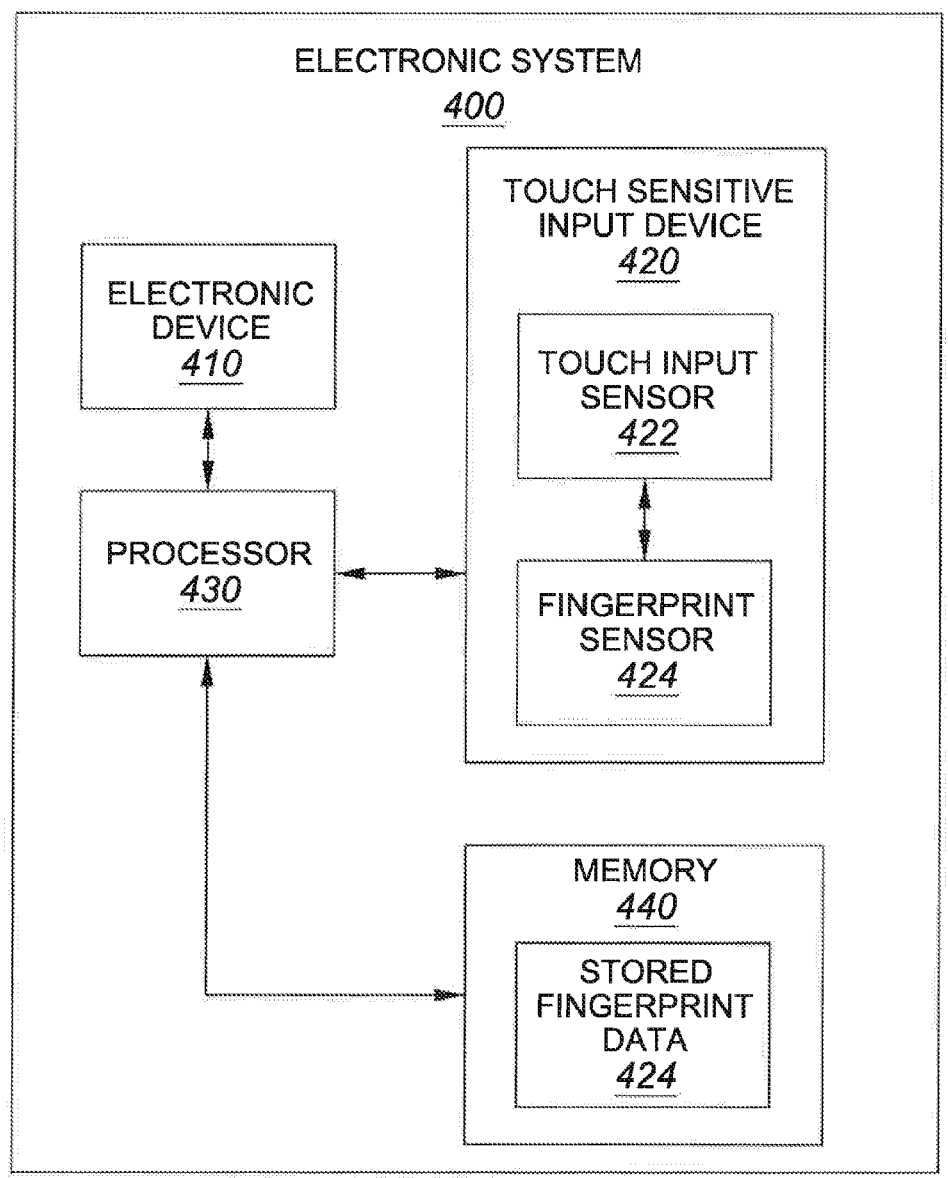
FIG. 5 is a block diagram of a system in accordance with one example embodiment of the present disclosure.

In some embodiments, the system 400 further comprises a memory 440 on which the stored fingerprint data 442 is stored. An example embodiment of the system 400 with the memory 440 is shown in the block diagram of FIG. 5. The memory 430 can be located on the electronic device 410 or remotely. In some embodiments the memory 440 is located on an authentication server. In some embodiments, the memory is a peripheral device such as an external hard drive. Non-limiting examples of the memory are non-volatile memory and persistent memory.

Figure 6:
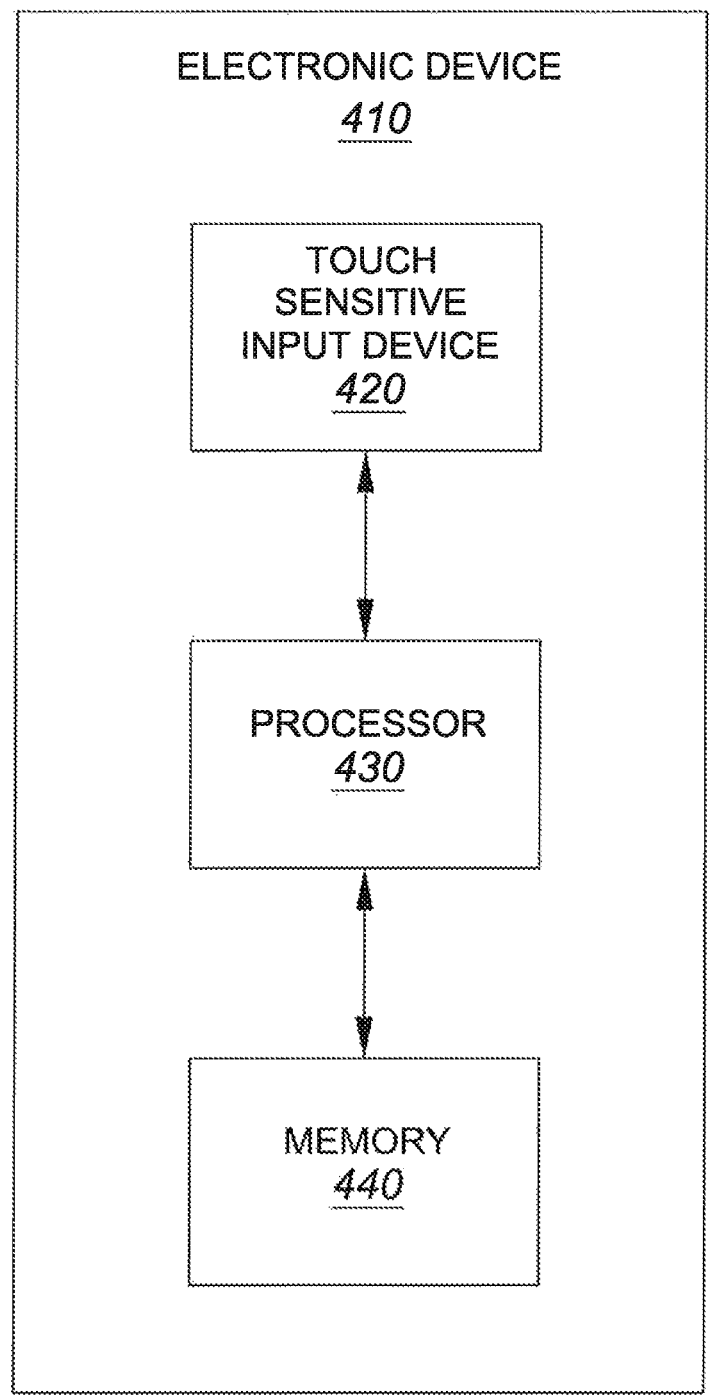
FIG. 6 is a block diagram of an electronic device in accordance with one example embodiment of the present disclosure.

Referring to FIG. 6, in some embodiments the electronic device 410 includes the touch sensitive input device 420 and the processor 430. In the embodiment shown in FIG. 6, the electronic device also includes the memory 440. However, as discussed previously, it is to be understood that the memory 440 need not be part of the electronic device 410. In other words, the stored fingerprint data 442 can be stored locally or remotely.

Figure 7:
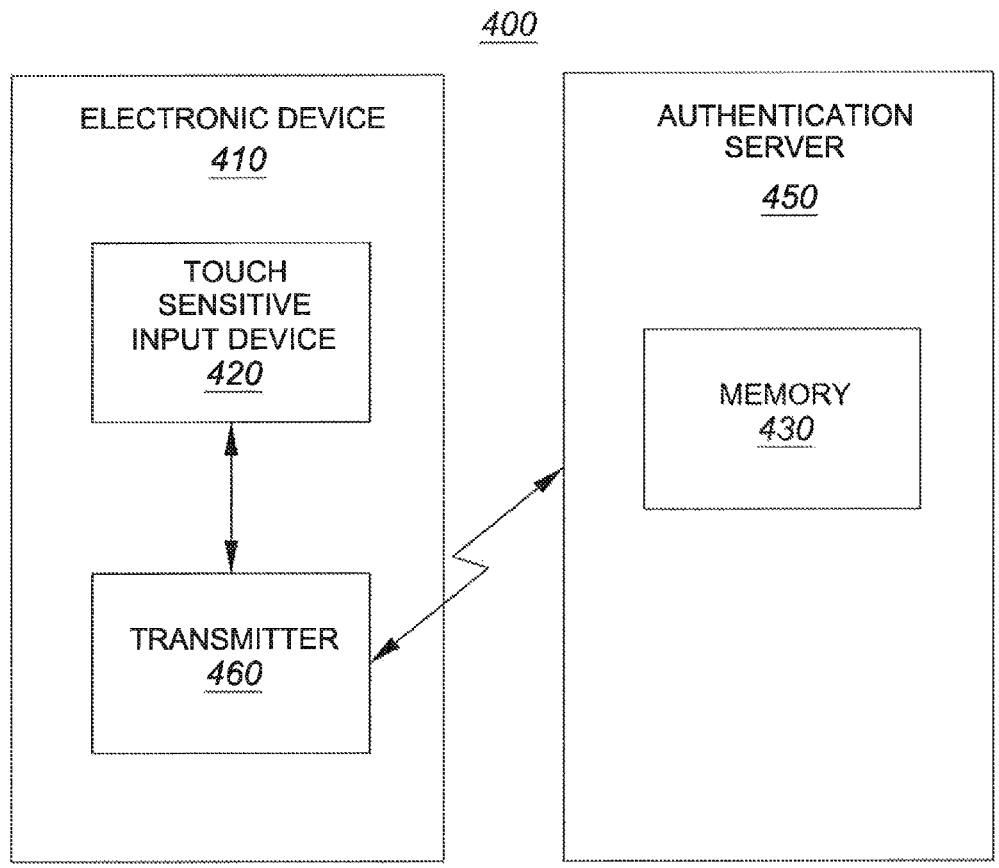
FIG. 7 is a block diagram of a system in accordance with one example embodiment of the present disclosure.

In some embodiments, the electronic system 400 further comprises a transmitter and the processor 430 is further configured to cause the transmitter to transmit the fingerprint data to an authentication server to determine if the captured fingerprint data matches the stored fingerprint data. An example embodiment including a transmitter 460 and an authentication server 450 is shown in FIG. 7. In the embodiment shown in FIG. 7, the transmitter 460 is part of the electronic device 410 and the memory 430 is part of the authentication server 450.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus and articles of manufacture, also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method comprising:
attempting to capture fingerprint data using a touch sensitive input device during operation of an electronic device to perform a function other than authentication; and
if, after a threshold time period, fingerprint data matching a stored fingerprint data is not captured, taking a security action related to access to at least a portion of the electronic device.

2. The method of claim 1, wherein taking the security action comprises denying access to the portion of the electronic device.

3. The method of claim 1, wherein taking the security action comprises initiating an authentication process.

4. The method of claim 1, wherein taking the security action comprises locking the electronic device.

5. The method of claim 1, wherein taking the security action comprises turning off the electronic device.

6. The method of claim 1, wherein attempting to capture the fingerprint data is after a successful authentication.

7. The method of claim 1, wherein the stored fingerprint data is fingerprint data for a person authorized to access the portion of the electronic device.

8. The method of claim 1, wherein the stored fingerprint data is fingerprint data for a person presently logged into the portion of the electronic device.

9. The method of claim 1, wherein the attempting to capture the fingerprint data is performed on a periodic basis.

10. The method of claim 1, further comprising transmitting the captured fingerprint data to an authentication server to determine if the captured fingerprint data matches the stored fingerprint data.

11. The method of claim 1 wherein attempting to capture fingerprint data using the touch sensitive input device occurs during operation of the electronic device to perform a function to navigate within an application.

12. A non-transitory computer-readable medium having computer-executable instructions stored thereon that when executed implement a method, the method comprising:
   attempting to capture fingerprint data using a touch sensitive input device during operation of an electronic device to perform a function other than authentication; and
   if, after a threshold time period, fingerprint data matching a stored fingerprint data is not captured, taking a security action related to access to at least a portion of the electronic device.

13. The non-transitory computer-readable medium of claim 12, wherein taking the security action comprises at least one of denying access to the portion of the electronic device, initiating an authentication process, locking the electronic device and turning off the electronic device.

14. An electronic system comprising:
   an electronic device;
   a touch sensitive input device comprising a touch input sensor and a fingerprint sensor; and
   a processor configured to attempt to capture fingerprint data from the fingerprint sensor during operation of the electronic device to perform a function other than authentication and if, after a threshold time period, fingerprint data matching a stored fingerprint data is not captured, take a security action related to access to at least a portion of the electronic device.

15. The electronic system of claim 14 further comprising a memory on which the stored fingerprint data is stored.

16. The electronic system of claim 14 further comprising a transmitter and wherein the processor is further configured to cause the transmitter to transmit the fingerprint data to an authentication server to determine if the captured fingerprint data matches the stored fingerprint data.

17. The electronic system of claim 14 wherein the electronic device includes the touch sensitive input device and the processor.

18. The electronic system of claim 14 wherein the electronic device comprises a mobile electronic device.

19. The electronic system of claim 14 wherein the stored fingerprint data is stored on a memory on the electronic device.

20. The electronic system of claim 14 wherein the stored fingerprint data is stored on a memory on a server.

21. The electronic system of claim 14 further comprising an authentication server.

22. The electronic system of claim 14 wherein the processor is configured to attempt to capture fingerprint data from the fingerprint sensor during operation of the electronic device to perform a function to navigate within an application.

* * * * *